Patented Apr. 17, 1934

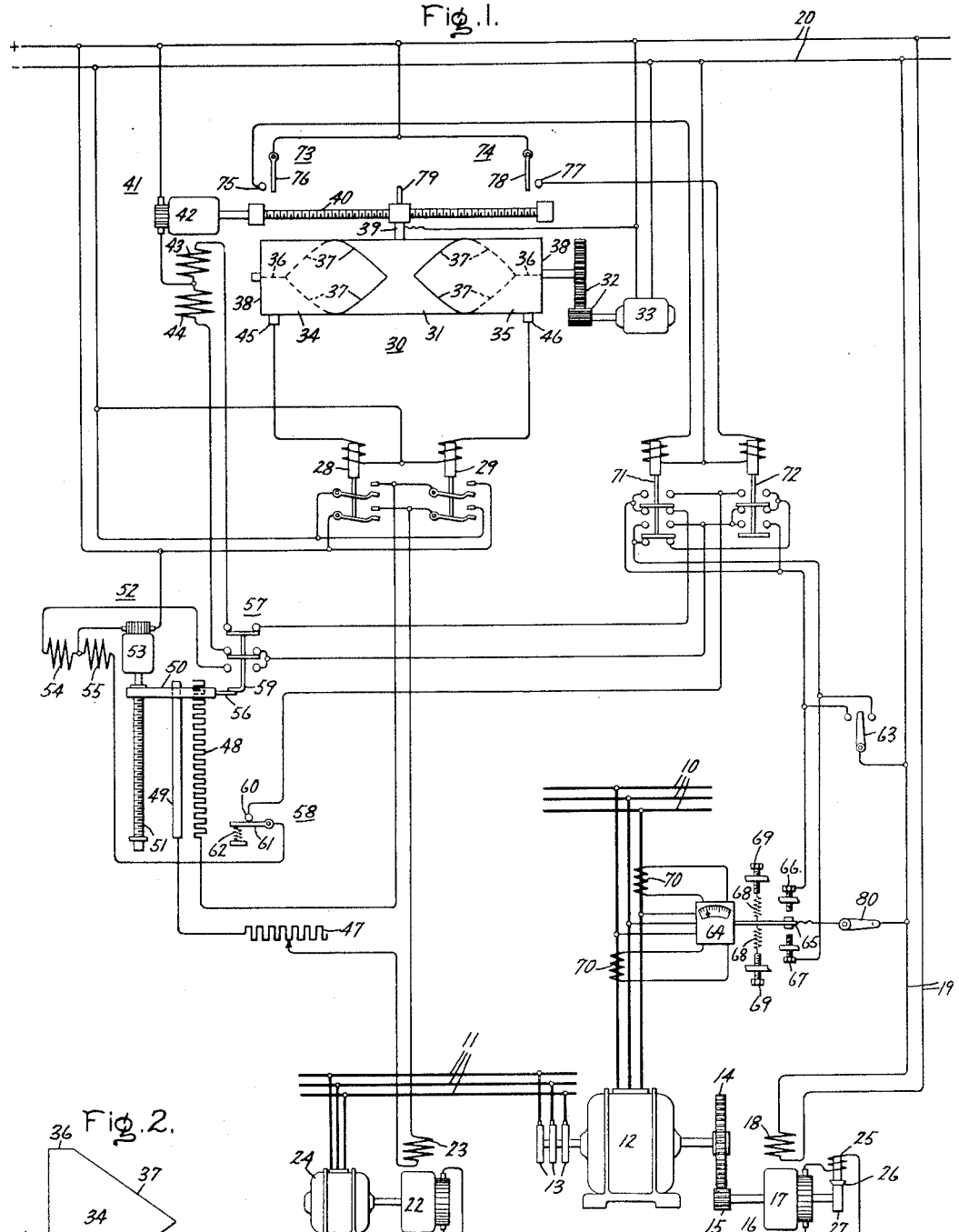

1,955,539

UNITED STATES PATENT OFFICE 1,955,539

CONTROL OF POWER TRANSFERRING APPARATUS

James W. Dodge, Schenectady, N. Y., assignor to General Electric Company, a corporation of New York Application November 18, 1933, Serial No. 698,644

18 Claims. (Cl. 172—281)

My invention relates to the control of power transferring apparatus. The main object of my invention is to provide a regulating arrangement for an induction frequency converter interconnecting two alternating current systems that will manually or automatically control the magnitude of the power flowing through the converter from one to the other of the two systems.

It is frequently desirable to transfer an adjustable but constant average value of power from one to the other of two alternating current systems with variations in their relative frequencies. This can be accomplished by employing an induction frequency converter interconnecting the two systems and a control arrangement for automatically exerting an adjustable but constant average value of torque on the rotor element of the converter, as shown for example in United States patent application Serial No. 663,537, Raymond F. Franklin, filed March 30, 1933, and assigned to the assignee of this application. The control arrangement shown in the above mentioned patent application consists of an energy translating device such as a direct current dynamo electric machine mechanically coupled to the rotor element of the converter and suitable means for automatically and continuously energizing the dynamo electric machine so as to maintain an adjustable but constant magnitude of power flow through the converter with variations in the relative frequencies of the two systems.

During the power transferring operation of the above described converter there may be periods when the frequencies of the two systems differ anywhere from a very small amount to quite an appreciable amount and there may be periods when they operate at the same frequency. Consequently, the direct current machine mechanically coupled to the converter may be required to operate anywhere from maximum to zero speed and its field and armature windings are continuously energized whether it is running or it is stationary in order to maintain the desired power flow through the converter. This continuous energization, however, produces the following two serious disadvantages: (1) the current flowing through the armature winding of the direct current machine during the period it is stationary heats and blackens those commutator bars on which the brushes happen to rest during this period, thus tending to raise these bars above the others which together with the blackening thereof tends to cause destructive sparking at the brushes during those power transferring periods when the machine is rotating; and (2) the fact that the direct current machine must be built so that its armature winding may with safety be continuously energized by the maximum current even when the machine is stationary tends to increase considerably its size and cost. The reason for this is that each type of direct current machine has some practical minimum operating speed below which it becomes impractical to operate it at its full load current and torque.

In accordance with my invention, however, these disadvantages are overcome by providing a control arrangement which effects an intermittent energization of the armature winding of the direct current machine so as to maintain the desired average power flow through the converter during those periods that the machine is stationary or is rotating below its minimum practical operating speed, and which effects a continuous energization of the armature winding to maintain this desired average power flow during those periods that the machine is rotating above its minimum practical operating speed, this intermittent and continuous energization occurring consecutively, and providing suitable brake means for maintaining the rotor element of the converter in its adjusted position during each non-energized period of the armature winding. The brake means are so arranged that they automatically become operative in response to the deenergization of the armature winding and non-operative in response to the energization of the armature winding. The armature winding of the direct current machine is now no longer continuously energized when it is stationary or when it is rotating below the minimum practical operating speed of the machine, hence the previously mentioned disadvantages are avoided and at the same time the machine operates to maintain the desired average power flow from one to the other of the two systems with variations in their relative frequencies.

My invention, however, will be best understood from the following description when considered in connection with the accompanying drawing, while those features of my invention which are believed to be novel and patentable are pointed out in the appended claims.

Fig. 1 of the drawing represents a preferred embodiment of my invention, whereas Fig. 2 represents a development of one of the electrically conducting segments of the controller shown in Fig. 1.

In Fig. 1, let 10 and 11 represent two alternating current three-phase systems. An asynchronous machine 12 has relatively rotatably primary and secondary windings, either of which may be connected to system 10 and the other connected to system 11. Thus, for example, machine 12 has a stationary primary winding connected to system 10, and a rotatable secondary winding connected through its collector rings 13 to system 11. A large gear 14 is secured to the shaft of machine 12, this gear meshing with a pinion 15 secured to the shaft of a direct current dynamo electric machine 16. Machine 16 has a rotatable commutated armature winding 17 and a stationary field winding 18 which is connected through leads 19 to a direct current source represented by 20. Another direct current dynamo electric machine 21 has a rotatable armature winding 22 and a stationary field winding 23, the shaft of this machine being mechanically coupled to the shaft of an asynchronous dynamo electric machine 24 whose primary winding is connected to source 11. Armature windings 17 and 22 are electrically connected in series with each other and in series with the coil of a solenoid operated brake 25 having a shoe 26 adapted to bear against the periphery of a brake drum 27 secured to the shaft of machine 16.

Field winding 23 of machine 21 may be connected to source 20 with the current flowing in a given direction through the winding by closing an electromagnetically operated switch 28 and in the opposite direction by closing an electromagnetically operated switch 29. The opening and closing of these switches are controlled by a motor driven controller represented generally by 30. This controller consists of a rotatable insulating drum 31 which is continuously driven through gears 32 by a direct current motor 33 connected to source 20. Secured to the periphery of drum 31 are two spaced apart electrically conducting segments 34 and 35. When developed, each segment has the shape of segment 34 shown in Fig. 2. Only the shape of segment 34 and the manner in which it is secured to drum 31 will be described since this will also be true of segment 35. The length between the ends 36 of segment 34 in Fig. 2 is equal to the circumference of drum 31 in Fig. 1. The tapered sides 37 of the segment come to a point and the segment is secured to the drum periphery so that its edge 38 is flush with the left-hand end of the drum. Segment 34 is bent around the periphery of drum 31 and secured thereto by any suitable means (not shown), hence its ends 36 meet, as shown in Fig. 1. It is therefore clear that extending from the left-hand end of drum 31 towards the right, there is for a short distance a strip of segment 34 completely encircling the drum periphery and then the segment fails to encircle the drum periphery by increasing amounts until the tapered sides 37 meet in a point. The same is correspondingly true of segment 35 except, of course, that this segment extends from the right-hand end of drum 31 towards its left-hand end.

Bearing on the periphery of drum 31 is a contact wiper 39 whose width is less than the shortest distance between the adjacent ends of segments 34 and 35. Wiper 39 is screwed on a threaded shaft 40 extending longitudinally above the periphery of drum 31, hence rotation of this shaft moves the wiper longitudinally along the drum periphery. Shaft 40 is secured to the shaft of a direct current pilot motor 41 which comprises a commutated armature winding 42 and two series exciting windings 43 and 44, the connections to the motor being described later.

Bearing on those portions of segments 34 and 35 which completely encircle the periphery of drum 31 are two brushes 45 and 46 respectively. Wiper 39 is connected to the upper line of source 20, one end of each coil of switches 28 and 29 is connected to the lower line of source 20, and the two remaining ends of these coils are connected to brushes 45 and 46 respectively. It is therefore clear that when wiper 39 is in its illustrated position it does not make contact with either of segments 34 and 35 as the latter are rotated, hence neither of switches 28 and 29 will close and no current will flow through field winding 23. If motor 41 is rotated so as to move wiper 39 continually to the left, it will, after moving a short distance, first make contact with the pointed end of segment 34 as the latter rotates and then make intermittent contact with the segment for increasing periods until finally it remains continuously in contact with the segment when it reaches that portion of the segment which completely encircles the periphery of drum 31. This, therefore, will cause switch 28 to be intermittently closed for increasing periods with decreasing open periods until the switch is finally held continually closed, and this in turn will cause an intermittent flow of current in a given direction through field winding 23 from source 20 for increasing periods with decreasing non-energizing periods until finally the field winding is continually energized. If, however, motor 41 is rotated so as to move wiper 39 continually to the right, it will, after moving a short distance, first make contact with the pointed end of segment 35 as the latter rotates and then make intermittent contact with the segment 35 for increasing periods until finally it remains continuously in contact with the segment when it reaches that portion of the segment which completely encircles the periphery of drum 31. This, therefore, will cause switch 29 to be intermittently closed for increasing periods with decreasing open periods until the switch is finally held continually closed, and this in turn will cause an intermittent flow of current in the opposite direction through field winding 23 from source 20 for increasing periods with decreasing non-energizing periods until finally the field winding is continually energized. The magnitude of the current flowing through field winding 23 is substantially the same during each intermittent energizing period and during the continuous energization thereof, and the magnitude of this current is varied only by the apparatus now to be described.

In series with field winding 23 is a manually adjustable resistance 47 and a power operated adjustable resistance 48. The power operated adjustable resistance comprises a metallic bar 49 over which slides a metallic contact bar 50 that also slides over resistance 48 and which is screwed on a threaded shaft 51 secured to a direct current pilot motor 52. It is clear that by rotating motor 52 in one direction or the other, the ohmic value of resistance 48 connected in series with field winding 23 can be varied. Motor 52 comprises a commutated armature winding 53 and two series exciting windings 54 and 55. Contact bar 50 has extending therefrom an arm 56 for operating either of two limit switches represented by 57 and 58. Limit switch 57 has three pairs of contacts and a switch arm 59 in the path of movement of arm 56. Limit switch 57 is so positioned and its contacts are so arranged that when contact bar 50 is at its uppermost position to insert the maximum ohmic value of resistance 48 in series with field winding 23 the switch arm is raised by arm 56 and only the top and middle pairs of contacts of the switch are closed, whereas after bar 50 moves slightly downward from its uppermost position the switch arm is lowered and only the lowest pair of contacts of the switch are closed.

Limit switch 58 comprises a stationary contact 60 and a cooperating movable switch blade 61 which is pivotally mounted to be in the path of movement of arm 56, the blade being yieldingly urged to engage contact 60 by a compression spring 62. Limit switch 58 is so positioned that when contact bar 50 is at its lowermost position whereby no portion of resistance 48 is in series with field winding 23 the blade 61 has been moved downwards from its illustrated position by arm 56 so that it does not engage contact 60.

I have provided manually operated means for sequentially controlling the operation of pilot motors 41 and 52 whereby the power flowing through machine 12 from one to the other of systems 10 and 11 may be manually regulated. I have also provided automatically operated means responsive to the flow of power through machine 12 from one to the other of systems 10 and 11 for automatically and sequentially controlling the operation of pilot motors 41 and 52 to maintain automatically the average magnitude of this power flow at any predetermined value with variations in the relative frequencies of the two systems. The manually operated means consists of a manually operated switch 63. The automatically operated means consists of a contact making wattmeter 64 having a switch blade 65 movable between and adapted to make contact with either of two stationary but adjustable contacts 66 and 67. Two tension springs 68 are secured to opposite sides of blade 65 and to stationary but adjustable screws 69. The current coils in wattmeter 64 are energized from current transformers 70 connected between system 10 and machine 12 and the potential coils of the wattmeter are energized directly from system 10, hence the wattmeter measures the power flowing through machine 12 from one to the other of systems 10 and 11. Wattmeter 64 is so constructed that its blade 65 moves up and down between contacts 66 and 67 in response to changes in the power being measured by the wattmeter. By adjusting screws 69 the blade 65 can be made to assume a position midway between contacts 66 and 67 for any desired value of power flow being measured by wattmeter 64 within its range of measurement, and by adjusting screws 66 and 67 it is possible to vary the change which must take place in the power flow being measured before blade 65 moves far enough to touch contact 66 or contact 67. I will assume that the wattmeter is so constructed that a decrease in the power flow measured thereby from system 10 to machine 12 causes its blade 65 to move upward and an increase in the power flow measured thereby causes its blade 65 to move downward. The internal structure of the wattmeter is not illustrated, since this is well known to those skilled in the art. The wattmeter is also provided with a pointer and a graduated scale calibrated in k. w. in order to indicate the power flow measured thereby, the object of this being to enable the operator to determine readily if the desired magnitude of power is flowing through machine 12, whether this power flow is being automatically or manually controlled.

The principle of the previously mentioned sequential control of the operation of pilot motors 41 and 52 for regulating the power flowing through machine 12 may be briefly explained as follows: Assume for example that wiper 39 and contact bar 50 are in their illustrated positions, and that the power flow through machine 12 is automatically controlled by wattmeter 64. Only pilot motor 41 will then be under the control of the wattmeter. If, now, the power flow through machine 12 should for any reason change sufficiently from its adjusted value, as determined by the adjustment of screws 69, to cause blade 65 to touch either of contacts 66 and 67, then pilot motor 41 will be operated to move wiper 39 to the right or left, to effect intermittent energization of field winding 23 for increasing periods until the adjusted value of power is again flowing through machine 12. Assume, however, that the power flowing through machine 12 is not brought to its adjusted value by the time wiper 39 has been moved far enough so that it is continuously in contact with segment 34 or 35, as the case may be, then wattmeter 64 loses control of pilot motor 41 and assumes control of pilot motor 52 and operates the latter to increase the magnitude of the now continuously flowing current through field winding 23 until the adjusted value of power again is flowing through machine 12. If now the power flowing through machine 12 should for any reason change from its adjusted value in the opposite manner previously assumed and this change in power is sufficient to cause blade 65 to touch either of contacts 66 and 67, then pilot motor 52 will be operated to change the magnitude of the continuously flowing current through field winding 23 until the adjusted value of power is again flowing through machine 12. Assume, however, that the power flowing through machine 12 is not brought to its adjusted value by the time contact bar 50 has reached its uppermost position so that the maximum ohmic value of resistance 48 is in series with field winding 23, then wattmeter 64 loses control of pilot motor 52 and assumes control of pilot motor 41 and operates this motor to effect intermittent energization of field winding 23 for decreasing periods until the adjusted value of power is again flowing through machine 12.

This sequential control of pilot motors 41 and 52 by wattmeter 64, or switch 63, as the case may be, is automatically effected by limit switch 57, previously described, and by two electromagnetically operated transfer relays 71 and 72 which in turn are controlled by two limit switches 73 and 74 on controller 30. Transfer relay 71 has four pairs of contacts and two pairs of bridging members so arranged that when the relay coil is unenergized the second pair of contacts from the top and the lowest pair of contacts are closed. Transfer relay 72 has three pairs of contacts and two pairs of bridging members so arranged that when the relay coil is unenergized only the middle pair of contacts is closed. Limit switch 73 comprises a stationary contact 75 and a movable pivotally mounted blade 76, whereas limit switch 74 comprises a stationary contact 77 and a movable pivotally mounted blade 78. Blades 76 and 78 are so arranged that when permitted to hang vertically by gravity, neither blade touches its cooperating contact. These blades are disposed in the path of movement of an arm 79 secured to wiper 39 so that when the wiper is moved sufficiently far to the right of its illustrated position to be continuously in contact with rotating segment 34 the arm will move blade 76 into engagement with contact 75 and when the wiper is moved sufficiently far to the left of its illustrated position to be continuously in contact with rotating segment 35 the arm will move blade 78 into engagement with contact 77. Blades 76 and 78 are connected to the upper line of source 20, one end of each of the operating coils of relays 71 and 72 is connected to the lower line of source 20 and the remaining two ends of these coils are connected to contacts 75 and 77 respectively. It is therefore clear that the closing of limit switch 73 effects the operation of relay 71 and the closing of limit switch 74 effects the operation of relay 72. Blade 65 of wattmeter 64 is connected in series with a normally closed switch 80 to the lower line of source 20. The remaining connections between contacts 66 and 67 of wattmeter 64, the contacts of transfer relays 71 and 72, limit switches 57 and 58, pilot motors 41 and 52 and source 20 are clearly illustrated and will be discussed during the operating description of the apparatus hereinafter given.

A clearer understanding of the operation of the previously described apparatus will be obtained by first giving the following explanation. Machine 12 functions both as a transformer and as a frequency changer because it has a rotatable secondary winding. It is therefore possible to have machine 12 tie together two systems whose frequencies are always different, or two systems whose basic frequencies are the same, but either or both of which vary in frequency, and to transfer a desired amount of power through machine 12 from one to the other of the two systems. The speed and direction of rotation of the rotor of machine 12 is independent of the amount and direction of the power flow transferred through the machine, and only depends on the relative number of poles in its primary and secondary windings and on the relative frequencies of systems 10 and 11. Assume, for the sake of simplicity, that the primary and secondary windings of machine 12 have the same number of poles, that the basic frequencies of systems 10 and 11 are 60 cycles per second, and that these windings are so connected to these systems that the stator and rotor fluxes in machine 12 revolve in the same direction. The rotor of machine 12 will then be stationary when systems 10 and 11 have the same frequency, the rotor will revolve in one direction when the frequency of system 10 is greater than that of system 11 and in the opposite direction when the frequency of system 10 is less than that of system 11, and the speed of rotation of the rotor will be directly proportional to the difference between the frequencies of the two systems.

Power can be transferred through machine 12 from one to the other of systems 10 and 11 by exerting an external torque on the rotor of the machine. The amount of power transferred through machine 12 from one to the other of systems 10 and 11 may be controlled by regulating the amount of torque exerted on the rotor, whereas the direction in which this power is transferred is controlled by exerting this torque in the proper direction. Thus, if no torque is exerted on the rotor of machine 12, the latter will not transfer power in either direction, if a torque is exerted on this rotor in one direction, the machine will transfer power from system 10 to system 11 and if a torque is exerted on this rotor in the opposite direction the machine will transfer power from system 11 to system 10. Increasing the amount of torque exerted on the rotor increases the amount of power being transferred and vice versa. The above described control of the magnitude and direction of the power transferred by machine 12 is true whether its rotor is stationary or rotates in either direction.

I will now describe the operation of the apparatus illustrated in Fig. 1. Assume that drum 31 is being continuously rotated by motor 33, that wiper 39 and all the switches and relays are in their illustrated positions, and that it is desired to employ wattmeter 64 for automatically controlling the magnitude of the power flow through machine 12, hence switch 80 will be left closed and switch 63 will be left open, as shown. Neither of pilot motors 41 and 52 will then be energized, nor will either of switches 28 or 29 be closed, hence no current will flow through field winding 23. The description of the operation of the apparatus will be facilitated by first making the following assumptions: That systems 10 and 11 are operating at the same frequency, for example 60 cycles per second, that it is desired to maintain automatically a flow of 1000 k. w. within plus or minus 10 k. w., from system 10 to system 11 through machine 12, that brake 25 is now holding the rotor of machine 12 in such a position that 1000 k. w. flows from system 10 to system 11 through the machine, that screws 69 are so adjusted that when 1000 k. w. is being measured by wattmeter 64 its blade 65 is midway between contacts 66 and 67 and that these contacts are so adjusted that when the power flow decreases to 990 k. w., for example, the blade will engage contact 66, and when the power flow increases to 1010 k. w., for example, the blade will engage contact 67. The operating description will then illustrate how wattmeter 64 automatically maintains a power flow of 1000 k. w., within a range of plus or minus 10 k. w., from system 10 to system 11 through machine 12 with variations in the relative frequencies of the two systems. It is clear that so long as the two systems continue to operate at 60 cycles per second, or at any other frequency providing they both operate at the same frequency, there will be no change in the magnitude of the power flow through machine 12 and, although field winding 18 of machine 16 is energized, no current will flow through the coil of brake 25 because armature winding 17 of machine 16 is stationary and field winding 23 of machine 21 is not energized, and therefore, the brake continues to hold the rotor of machine 12 in that position which causes 1000 k. w. to flow from system 10 to system 11 through machine 12.

Now, assume that a slow variation in the relative frequencies of systems 10 and 11 takes place so as to decrease the magnitude of power flow from system 10 to system 11. When the power flow has decreased to 990 k. w., blade 65 will engage contact 66, thus completing a circuit for pilot-motor 41, from source 20. This circuit is from the upper line of source 20, through armature winding 42 and field winding 43 of the motor, the upper pair of contacts of limit switch 57, the second pair of contacts from the top of relay 71, contact 66 and blade 65 of wattmeter 64 and switch 80 to the lower line of source 20. This causes pilot motor 41 to rotate in such a direction as to move wiper 39 to the left, for example. After the wiper moves slightly to the left it comes in contact with segment 34 as the latter rotates and with continued movement of the wiper to the left the wiper comes into intermittent contact with the segment for increasing periods. Each time wiper 39 contacts with segment 34 it completes a circuit for the coil of switch 28, thus effecting the closing of this switch and therefore effecting the energization of field winding 23.

Intermittent contact between wiper 39 and segment 34 for increasing periods therefore causes intermittent energization of field winding 23 for increasing periods with the same magnitude of current flowing through the winding in the same direction therethrough during each period. Each time field winding 23 is energized, it causes machine 21 to generate a voltage and to circulate a current through armature windings 22 and 17 and the coil of brake 25. This causes the brake to lift its shoe 26 and machine 16 to produce a torque at its shaft. I will assume that the torque produced by machine 16 is in such a direction as to rotate the rotor of machine 12 in that direction which increases the power flow through the latter from system 10 to system 11. If the variation in the relative frequencies of systems 10 and 11 is sufficiently slow the power flow will be increased to above 990 k. w. the first time field winding 23 is energized and blade 65 will move away from contact 66, hence pilot motor 41 will be disconnected from source 20, the motor will soon stop rotating and wiper 39 will cease moving. If, however, the variation in the relative frequencies of the two systems is sufficiently rapid so that the power flow is not increased to above 990 k. w. the first time field winding 23 is energized, then blade 65 will continue to engage contact 66 and pilot motor 41 will continue to rotate and move wiper 39 to the left. Since each time field winding 23 is connected to source 20, the rotor of machine 12 is rotated in a direction to increase the power flow through the machine and since each time the field winding is disconnected from the source the cessation of current flow through armature windings 22 and 17 and the coil of brake 25 causes the latter to lock the rotor of machine 12 in the position it was rotated to during the preceding period of energization of the field winding, the rotor will be intermittently rotated as wiper 39 continues to move to the left until the power flow through machine 12 has been increased to above 990 k. w. and the blade 65 will move away from contact 66, thus stopping movement of wiper 39. If there is no further change in the relative frequencies of systems 10 and 11, then blade 65 will not touch either of contacts 66 and 67 and wiper 39 will remain in the position it occupied when pilot motor 41 ceased rotating. In that case each subsequent energization of field winding 23 causes brake 25 to release and machine 16 to change the position of the rotor of machine 12 to compensate for any phase angle shift between the voltages of systems 10 and 11 which may have occurred between periods of energization.

Assume, however, that there still exists a slow variation in the relative frequencies of these systems in a manner to decrease the power flow through the machine, then the power flow will again decrease to below 990 k. w., hence blade 65 will again engage contact 66, thus again causing pilot motor 41 to rotate and move wiper 39 to the left. This causes field winding 23 to be again energized intermittently for increasing periods, hence causing machine 16 to rotate intermittently the rotor of machine 12 in a direction to increase the power flow through machine 12 so long as this power flow is below 990 k. w. For the sake of illustration, assume that although during each period that field winding 23 is energized the rotor of machine 12 is rotated sufficiently to bring the power flow through this machine to within the desired limits, yet the above mentioned variation in the relative frequencies of systems 10 and 11 is sufficiently rapid so that this power flow is not maintained within the desired limits even though wiper 39 has moved so far to the left that it is continually in contact with segment 34 during rotation of the latter which therefore causes continuous energization of field winding 23. Wiper 39 will therefore continue to move to the left until arm 79 engages blade 76 of limit switch 73 and moves the blade into engagement with contact 75. This closing of limit switch 73 effects the energization of the coil of transfer relay 71, hence this relay closes. The closing of relay 71 completes a circuit for pilot motor 52 from source 20 in such a manner as to place this motor under the control of wattmeter 64. This circuit is from the upper line of source 20, through armature winding 53 and field winding 55 of the motor, limit switch 58, the now closed top pair of contacts of relay 71, contact 66 and blade 65 of wattmeter 64 and switch 80 to the lower line of source 20. This causes pilot motor 52 to rotate in such a direction as to move contact bar 50 downward, thus continually increasing the magnitude of the now continuously flowing current in field winding 23. This causes a continually increasing torque to be exerted by machine 16 on the rotor of machine 12 in a direction to increase the power flow through machine 12 and when this power flow has been increased to slightly above 990 k. w. the blade 65 will move away from contact 66, thus opening the circuit for pilot motor 52 and the latter soon stops rotating. If the previously mentioned variation in the relative frequencies of systems 10 and 11 is such that the power flow through machine 12 is not increased to slightly above 990 k. w. even though contact bar 50 has been moved to its lowermost position in which no portion of resistance 48 is in series with exciting winding 23, then the control apparatus has been brought to its limit of operation since field winding 23 is now continually energized with the maximum value of current flow therethrough. Further rotation of pilot motor 52 to move contact bar 50 downward is therefore unnecessary and the motor should be brought to rest. This is effected by arm 56 on contact bar 50 engaging blade 61 of limit switch 58 and moving the blade away from contact 60 when bar 50 is at its lowermost position. The opening of limit switch 58 opens the circuit of pilot motor 52 through contact 66 of wattmeter 64, hence the motor soon stops rotating. The moving downward of contact bar 50 a slight amount from its uppermost position causes the opening of the top and middle pairs of contacts of limit switch 57 and the closing of its lowest pair of contacts. The opening of the top and middle pairs of contacts of limit switch 57 opens the circuit of pilot motor 41, thus removing control of this motor by wattmeter 64, whereas the closing of the lowest pair of contacts of this switch completes a circuit which makes it possible for wattmeter 64 to cause rotation of pilot motor 52 in the opposite direction so as to raise contact bar 50, as will be more fully described later.

Now, assume that the relative frequencies of systems 10 and 11 start varying in the opposite manner from that previously mentioned after contact bar 50 has been lowered at least enough to cause the opening of the top and middle pairs of contacts of limit switch 57 and the closing of its lowest pair of contacts. This causes the power flow through machine 12 to increase and when the power flow increases to 1010 k. w. blade 65 will engage contact 67, thus completing a circuit for pilot motor 52 from source 20, through armature winding 53 and field winding 54 of the motor, the now closed lowest pair of contacts of limit switch 57, the now closed third from the top pair of contacts of relay 71, contact 67 and blade 65 of wattmeter 64 and switch 80 to the lower line of source 20. This causes pilot motor 52 to rotate in such a direction as to raise contact bar 50, thus continually decreasing the magnitude of the now continuously flowing current through field winding 23. This reduces the torque exerted by machine 16 on the rotor of machine 12, thus reducing the power flow through machine 12. When this power flow has been reduced to slightly below 1010 k. w. blade 65 will move away from contact 67, thus opening the circuit to pilot motor 52 and the latter soon stops rotating. If there is no further change in the relative frequencies of systems 10 and 11, then there will be no further change in this power flow, blade 65 will not touch either of contacts 66 and 67 and contact bar 50 will remain in the position it occupied when pilot motor 52 ceased rotating.

Assume, however, that the relative frequencies of the two systems still continue to vary in a manner to increase this power flow. When this power flow again increases to 1010 k. w. blade 65 will again engage contact 67, thus causing pilot motor 52 to rotate in a direction to raise contact bar 50. For the sake of illustration, assume that the variation in the relative frequencies of systems 10 and 11 continues so that the power flow through machine 12 is not maintained within the desired limits, though contact bar 50 has been raised to its uppermost position. The raising of bar 50 to its uppermost position causes the closing of the top and middle pairs of contacts of limit switch 57 and the opening of its lowest pair of contacts. The opening of the lowest pair of contacts of switch 57 opens the circuit of motor 52, hence this motor soon ceases rotating, whereas the closing of the top and middle pairs of contacts of limit switch 57 completes a circuit for pilot motor 41 to place this motor under the control of wattmeter 64. This circuit is from the top line of source 20, through armature winding 42 and field winding 44 of motor 41, the middle pair of contacts of limit switch 57, the now closed third from the top pair of contacts of relay 71, contact 67 and blade 65 of wattmeter 64 and switch 80 to the lower line of source 20. This causes pilot motor 41 to rotate in such a direction as to move wiper 39 to the right. As soon as wiper 39 has moved slightly to the right, blade 76 of limit switch 73 moves away from contact 75, thus opening the circuit of the coil of relay 71 and this relay opens. The opening of relay 71 completely removes the control of pilot motor 52 by wattmeter 64. Although the opening of relay 71 opens its third from the top pair of contacts, this does not permanently open the circuit of pilot motor 41 because the opening of this relay also closes its lowest pair of contacts, thus reestablishing a circuit for this motor. This circuit is identical with that last described except that the second par from the top closed contacts of relay 72 and the closed lowest pair of contacts of relay 71 replace the third from the top pair of contacts of relay 71, hence pilot motor 41 continues to rotate in such a direction as to move wiper 39 to the right. This causes intermittent energization of field winding 23 for decreasing periods with the same magnitude of current flowing through the field winding during each energized period. This in turn causes machine 16 to rotate the rotor of machine 12 in a direction to decrease the power flow through machine 12 during each period that field winding 23 is energized.

For the sake of illustration, assume that the relative frequencies of systems 10 and 11 continue to vary so that the power flow is not maintained within the desired limits even though wiper 39 has been moved to its illustrated position where it does not contact with either of segments 34 and 35 during rotation of the latter. Blade 65 will therefore continue to touch contact 67, hence pilot motor 41 will continue to move wiper 39 to the right. This causes wiper 39 to make intermittent contact with segment 35 for increasing periods, thus effecting intermittent closing of switch 29 for increasing periods. This causes an intermittent flow of current through field winding 23 for increasing periods with the current flowing through the winding in the opposite direction from that previously assumed. This in turn causes the current flowing in armature winding 17 of machine 16 every time field winding 23 is energized to be in the opposite direction from that previously assumed, hence every time field winding 23 is energized machine 16 exerts a torque on the rotor of machine 12 in the opposite direction from that previously assumed. Therefore as wiper 39 is moved to the right over segment 35 the rotor of machine 12 is intermittently rotated by machine 16 in a direction to decrease the power flow through machine 12. Assume, however, for the sake of illustration, that the relative frequencies of systems 10 and 11 continue to vary so that the power flow is not maintained within the desired limits even though wiper 39 has been moved so far to the right as to be continually in contact with segment 35 during rotation of the latter. Wiper 39 will therefore continue to move to the right and arm 79 will cause blade 78 of limit switch 74 to engage contact 77. The closing of switch 74 effects the energization of the coil of relay 72, hence this relay closes. The closing of relay 72 opens its second from the top pair of contacts, thus opening the circuit of pilot motor 41 and the motor soon ceases rotating.

The closing of relay 72, however, completes a circuit for pilot motor 52 so as to place this motor under the control of wattmeter 64. This circuit is from the top line of source 20, through armature winding 53 and field winding 55 of motor 52, limit switch 58, the now closed top pair of contacts of relay 72, the lowest pair of contacts of relay 71, contact 67, and blade 65 of wattmeter 64, and switch 80 to the lower line of source 20. This causes motor 52 to rotate in such a direction as to move contact bar 50 downwards, thus continuously increasing the magnitude of the now continuously flowing current in field winding 23. This in turn causes machine 16 to rotate the rotor of machine 12 continuously in a direction to reduce the flow of power through machine 12. When this power flow has been reduced to slightly below 1010 k. w. the blade 65 moves away from contact 67, thus opening the circuit of motor 52 and the motor ceases rotating. The moving downward of contact bar 50 a slight amount from its uppermost position causes the opening of the top and middle pairs of contacts of limit switch 57 and the closing of its lowest pair of contacts, thus completely removing the control of motor 41, by wattmeter 64 and completing a circuit which makes it possible for the wattmeter to cause rotation of motor 52 in the opposite direction so as to raise contact bar 50. If the previously mentioned variations in the relative frequencies are such that the power flow through machine 12 is not maintained within the desired limits even though contact bar 50 has been moved to its lowest position, then arm 56 on contact bar 50 opens limit switch 53, thus opening the circuit of motor 52 and the latter soon ceases rotating. From the description given it will be clear that if the relative frequencies of systems 10 and 11 now start to vary in a manner to decrease the power flow through machine 12, then the reverse operation of that last described will take place so as to maintain the power flow through machine 12 within the desired limits. It should also be clear that if there is a rapid variation in the relative frequencies of systems 10 and 11 instead of the slow variation previously assumed, the operation of the apparatus will be identical to that described except that wiper 39 will be moved more frequently across drum 31 with a rapid frequency variation than a slow frequency variation. My apparatus is therefore capable of maintaining the desired average power flow within the frequency variation of the two systems for which it is designed to operate.

If it is desired to maintain manually any desired average value of power flow through machine 12 from one to the other of systems 10 and 11, then this result may be obtained by opening switch 80 and suitably manipulating switch 63. Since the blade of switch 63 and blade 65 of wattmeter 64 are both connected to the same line of source 20 and since the two contacts of switch 63 are connected to contacts 66 and 67 respectively of the wattmeter, the operation of the apparatus obtained by manipulating switch 63 will be similar to that described except that the power flow through machine 12 will be manually regulated by switch 63 instead of automatically regulated by wattmeter 64.

In accordance with the provisions of the patent statutes I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for effecting intermittent operation of said energy translating means, and means for controlling the operation of the third mentioned means to maintain the average magnitude of the power flow through said converter at a substantially constant value with variations in the relative frequencies of said systems.

2. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for effecting intermittent operation of said energy translating means for varying periods with the non-operating periods varying inversely relative to the variation in the operating periods, and means for controlling the operation of the third mentioned means to maintain the average magnitude of the power flow through said converter at a substantially constant value with variations in the relative frequencies of said systems.

3. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for effecting intermittent operation of said energy translating means, means for controlling the operation of the third mentioned means for thereby controlling the magnitude of the power flow through said converter from one to the other of said systems, a brake for locking the rotor element of said converter, and means responsive to the operation of said energy translating means for effecting the operation of the brake during the non-operating periods of said energy translating means.

4. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for sequentially effecting intermittent operation of said energy translating means for increasing periods over a predetermined portion of the operating range followed by continuous operation of said energy translating means during the remainder of the operating range, and vice versa with decreasing periods instead of increasing periods during said predetermined portion of the operating range, and means for controlling the operation of the third mentioned means to maintain the average magnitude of the power flow through said converter at a substantially constant value with variations in the relative frequencies of said systems.

5. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, and means for sequentially effecting intermittent operation of said translating means for increasing periods over a predetermined portion of the operating range to maintain the average magnitude of the power flow through the converter at a substantially constant value with variations in the relative frequencies of said systems, and effecting continuous operation of said translating means during the remainder of the operating range to maintain a substantially constant average magnitude of power flow through said converter with variations in the relative frequencies of said systems, and for effecting vice versa sequential operation with decreasing periods instead of increasing periods during said predetermined portion of the operating range to maintain said substantially constant average magnitude of power flow through said converter.

6. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for sequentially effecting intermittent operation of said energy translating means for increasing periods over a predetermined portion of the operating range with substantially the same rate of power flow through the energy translating means during each operating period followed by continuous operation of said energy translating means with substantially said rate of power flow therethrough during the remainder of the operating range, and vice versa with decreasing periods instead of increasing periods during said predetermined portion of the operating range, means for increasing and decreasing the rate of power flow through said energy translating means, means responsive to the flow of power through said converter from one to the other of said systems for controlling the operation of the third mentioned means to maintain the average magnitude of this power flow at a substantially constant value with variations in the relative frequencies of said systems, and means responsive to the operation of the third mentioned means for removing the control thereof by the fifth mentioned means and for placing the fourth mentioned means under the control of the fifth mentioned means when said energy translating means is operating continuously.

7. A regulating arrangement for an induction frequency converter having stator and rotor winding elements respectively connected to two alternating current systems, said arrangement comprising energy translating means having a rotatable shaft mechanically connected to the rotor element of the frequency converter for exerting a torque thereon, means operatively associated with said energy translating means for supplying power thereto and for consuming power delivered thereby, means for sequentially effecting intermittent operation of said energy translating means for increasing periods over a predetermined portion of the operating range with substantially the same rate of power flow through the energy translating means during each operating period followed by continuous operation of said energy translating means with substantially said rate of power flow therethrough during the remainder of the operating range, and vice versa with decreasing periods instead of increasing periods during said predetermined portion of the operating range, means for increasing and decreasing the rate of power flow through said energy translating means, manually operable means for controlling the operation of the third mentioned means for thereby controlling the magnitude of the power flow through said converter from one to the other of the said systems, and means responsive to the operation of the third mentioned means for removing the control thereof by said manually operable means and for placing the fourth mentioned means under the control of the manually operable means when said energy translating means is operating continuously.

8. A regulating arrangement for an induction frequency converter having stator and rotor winding elements respectively connected to two alternating current systems, said arrangement comprising a dynamo electric machine having its shaft mechanically coupled to the rotor element of the frequency converter for exerting a torque thereon, means operatively associated with said dynamo electric machine for supplying electric power thereto and for consuming electric power delivered thereby, means for effecting intermittent torque producing operation of said dynamo electric machine, and means for controlling the operation of the second mentioned means to maintain the average magnitude of the power flow through said converter at a substantially constant value with variations in the relative frequencies of said systems.

9. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, voltage producing means electrically connected to said armature winding, said voltage producing means being capable of supplying direct current to said armature winding and of consuming direct current supplied thereto by said armature winding, means for effecting continuous energization by direct current of one of the windings of said dynamo electric machine, means for effecting intermittent energization by direct current of the other winding of said dynamo electric machine, and means for controlling the operation of the third mentioned means to maintain the average magnitude of the power flow through said converter at a substantially constant value with variations in the relative frequencies of said system.

10. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, means for effecting continuous energization by direct current of one of the windings of said dynamo electric machine, means for intermittently impressing substantially the same magnitude of direct current voltage on the other winding of said dynamo electric machine for varying periods with the non-operating periods varying inversely relative to the variation in the operating periods, and means for controlling the operation of the second mentioned means to maintain the average magnitude of the power flow through said converter at a substantially constant value with variations in the relative frequencies of said systems.

11. A regulating arrangement for an induction frequency converter having stator and rotor winding elements respectively connected to two alternating current systems, said arrangement comprising a dynamo electric machine having its shaft mechanically coupled to the rotor element of the frequency converter for exerting a torque thereon, means operatively associated with said dynamo electric machine for supplying electric power thereto and for consuming electric power delivered thereby, means for effecting intermittent torque producing operation of said dynamo electric machine, means for controlling the operation of the second mentioned means for thereby controlling the magnitude of the power flow through said converter from one to the other of said systems, a brake for locking the rotor element of said converter, and means responsive to the operation of said dynamo electric machine for effecting the operation of said brake during the non-operating periods of the dynamo electric machine.

12. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, a second direct current dynamo electric machine having relatively rotatable field and armature windings, said armature windings being electrically connected in series, a third dynamo electric machine mechanically coupled to the second mentioned dynamo electric machine, means for continuously energizing one of said field windings with direct current, means for intermittently effecting a flow of direct current in either direction through the other field winding for varying periods, and means for controlling the operation of the second mentioned means to maintain the average magnitude of the power flow through said converter at a substantially constant value with variations in the relative frequencies of said systems.

13. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, means for continuously energizing one of the windings of said dynamo electric machine by direct current, means for sequentially impressing a predetermined magnitude of direct current voltage of a given polarity on the other winding of said dynamo electric machine for increasing periods followed by continually impressing this voltage on the winding and for sequentially impressing a predetermined magnitude of direct current voltage of the opposite polarity on said other winding of said dynamo electric machine for increasing periods followed by continually impressing this voltage on the winding, and means responsive to the flow of power through said converter from one to the other of said systems for controlling the operation of the second mentioned means to maintain the average magnitude of this power flow at a substantially constant value with variations in the relative frequencies of said systems.

14. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, a controller having a contact wiper bearing on the periphery of an insulating drum and two spaced apart electrically conducting segments secured to the drum periphery, said segments and wiper being relatively rotatable and said wiper being movable longitudinally along said drum periphery, the width of said wiper being less than the shortest distance between the adjacent ends of said segments whereby in a given position the wiper fails to contact with either segment during operation of the controller, and the shape of said segments being such that longitudinal movement of the wiper in one direction from its non-contacting position effects intermittent contact between it and one of the segments for increasing periods and longitudinal movement of the wiper in the opposite direction from its non-contacting position effects intermittent contact between it and the other segment for increasing periods, means for effecting continuous energization of one of the windings of said dynamo electric machine by direct current, means including said wiper and said conducting segments for effecting a flow of direct current in one direction through the other winding of said dynamo electric machine when the wiper contacts with one of said segments and for effecting a flow of direct current in the opposite direction through said other winding of the dynamo electric machine when the wiper contacts with the other segment, and means for controlling the longitudinal position of said wiper on said drum periphery.

15. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, a second direct current dynamo electric machine having relatively rotatable field and armature windings, said armature windings being electrically connected in series, a third dynamo electric machine mechanically coupled to the second mentioned dynamo electric machine, means for continually energizing one of said field windings by direct current, means including two switches for effecting a flow of direct current in one direction through the other field winding when one of these switches is closed and in the opposite direction when the other switch is closed, two spaced apart electrically conducting segments secured to the periphery of a continuously rotating insulating drum, a contact wiper bearing on the drum periphery and movable longitudinally therealong, the width of said wiper being less than the shortest distance between the adjacent ends of said segments whereby in a given position the wiper fails to make contact with either segment, and the shape of said segments being such that longitudinal movement of the wiper in one direction from its non-contacting position effects intermittent contact between it and one of the segments for increasing periods and longitudinal movement of the wiper in the opposite direction from its non-contacting position effects intermittent contact between it and the other segment for increasing periods, means including said segments and wiper for effecting the closing of one of said switches when the wiper contacts with one of said segments and for effecting the closing of the other switch when the wiper contacts with the other segment, and means for controlling the longitudinal position of said wiper on said drum periphery.

16. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, means for continually energizing one of the windings of said dynamo electric machine by direct current, means for sequentially impressing a predetermined magnitude of direct current voltage on the other winding of said dynamo electric machine for increasing periods over a predetermined portion of the operating range followed by continually impressing this voltage on the winding, and vice versa with decreasing periods instead of increasing periods during said predetermined portion of the operating range, means for increasing and decreasing the magnitude of the direct current voltage impressed on said other winding, means for controlling the operation of the second mentioned means for thereby controlling the magnitude of the power flow through said converter from one to the other of said systems, and means responsive to the operation of the second mentioned means for removing the control thereof by said fourth mentioned means and for placing the third mentioned means under the control of the fourth mentioned means when said voltage is being continuously impressed on said other winding.

17. A regulating arrangement for an induction frequency converter having stator and rotor winding elements respectively connected to two alternating current systems, said arrangement comprising a direct current dynamo electric machine having its shaft mechanically coupled to the rotor element of the frequency converter for exerting a torque thereon, said dynamo electric machine having relatively rotatable field and armature windings, a second direct current dynamo electric machine having relatively rotatable field and armature windings, said armature windings being electrically connected in series, a third dynamo electric machine mechanically coupled to the second mentioned dynamo electric machine, means for continuously energizing one of said field windings with direct current, two continually rotating spaced apart electrically conducting segments secured to the periphery of an insulating drum, a contact wiper bearing on the drum periphery, a motor for changing the longitudinal position of said wiper on said drum periphery, the width of said wiper being less than the shortest distance between the adjacent ends of said segments whereby in a given position the wiper fails to make contact with either segment, and the shape of said segments being such that longitudinal movement of the wiper in one direction from its non-contacting position effects intermittent contact between it and one of the segments for increasing periods followed by continuous contact therebetween and longitudinal movement of the wiper in the opposite direction from its non-contacting position effects intermittent contact between it and the other segment for increasing periods followed by continuous contact therebetween, means including said segments and wiper for effecting a flow of direct current in one direction through the other field winding when the wiper contacts with one of the segments and in the opposite direction when the wiper contacts with the other segment, an adjustable resistance connected in series with said other field winding, a motor for changing the ohmic value of said resistance in series with said other field winding, means for controlling the operation of the first mentioned motor, means responsive to the operation of said wiper for removing the control of the first mentioned motor by the third mentioned means and for placing the second mentioned motor under the control of the third mentioned means when the wiper is continually in contact with either segment, and means responsive to the operation of the second mentioned motor for removing the control thereof by the third mentioned means and for placing the first mentioned motor under the control of the third mentioned means when the maximum ohmic value of said resistance is inserted in series with said other field winding.

18. A regulating arrangement for an induction type frequency converter comprising in combination with such a converter means for producing torque on the shaft of the converter and mechanical means effective only when said torque producing means is inactive for locking the shaft of the converter from rotation.

JAMES W. DODGE.